United States Patent
Reay

(10) Patent No.: US 8,313,228 B2
(45) Date of Patent: Nov. 20, 2012

(54) AGITATION DEVICE

(76) Inventor: Gavin Reay, London (GB)

(*) Notice: Subject to any disclaimer, the term of this patent is extended or adjusted under 35 U.S.C. 154(b) by 501 days.

(21) Appl. No.: 12/556,744

(22) Filed: Sep. 10, 2009

(65) Prior Publication Data

US 2010/0074046 A1 Mar. 25, 2010

Related U.S. Application Data

(63) Continuation-in-part of application No. PCT/GB2008/051034, filed on Nov. 6, 2008.

(30) Foreign Application Priority Data

Nov. 9, 2007 (GB) .................................. 0722006.4

(51) Int. Cl.
*B01F 11/00* (2006.01)
(52) U.S. Cl. ........................................ 366/118; 366/117
(58) Field of Classification Search .................. 366/117, 366/118, 120–123, 129
See application file for complete search history.

(56) References Cited

U.S. PATENT DOCUMENTS

| 2,214,142 | A | * | 9/1940 | Mall | 366/122 |
| 2,445,196 | A | * | 7/1948 | West | 174/50.52 |
| 2,544,248 | A | * | 3/1951 | Ashmead | 132/73.6 |
| 3,991,983 | A | * | 11/1976 | Drynan | 366/129 |
| 4,252,444 | A | * | 2/1981 | Herz | 366/117 |
| 4,778,279 | A | * | 10/1988 | Bodine | 366/118 |
| 2005/0054958 | A1 | * | 3/2005 | Hoffmann | 601/46 |

* cited by examiner

Primary Examiner — David Sorkin
(74) Attorney, Agent, or Firm — Eugene M. Cummings, P.C.

(57) ABSTRACT

The present invention provides an agitation device (10) comprising a body portion (12) and at least one stirring element (14) extending from said body portion and for insertion into material in a receptacle which is to be agitated, wherein the body portion comprises a housing having located therein a motion element powered by way of a power source, and arranged to impart a vibrating action to the device and thus to the at least one stirring element, said vibrating action arranged to effect movement of the agitation device relative to the said material, and wherein said at least one stirring element extends from said body portion such that, in normal operation, the at least one stirring element extends downwardly from the body portion and serves to support the device on a surface of the said receptacle.

35 Claims, 8 Drawing Sheets

AGITATION DEVICE

CROSS-REFERENCE TO RELATED APPLICATIONS

The present patent application is a continuation-in-part of International Application No. PCT/GB/2008/051034, with an international filing date of Nov. 6, 2008, claiming the benefit of G.B. Application No. 0722006.4, filed on Nov. 9, 2007, and U.S. Design Patent Application No. 29304283 filed on Feb. 28, 2008, and claims the benefit of Community Design Registration No. 001507625 filed on May 8, 2009.

BACKGROUND

The present invention relates to an agitation device and particularly, but not exclusively, to an agitation device for agitating ingredients in the preparation of food.

The use of agitation devices in laboratories and various industries such as the building industry (where such agitation devices may be used to agitate, by way of stirring and/or mixing, for example, paints, plaster, concrete/cement, etc), the food industry, etc. is prevalent. Such agitation devices are available with numerous shapes/configurations, such as: turbine type; impeller type; cross-beam type; frame type; blade type; anchor type; pitched-blade type; propeller type; helical ribbon type; whisks, etc, and these agitation devices can be manually powered, electrically powered, mechanically powered, and can be driven directly, or indirectly by way of gears.

The type of agitation device to be used is dependent upon the material(s) to be agitated. Whisks are particularly suitable for use in both the food industry and for domestic food preparation and their design facilitates mixing, circulation, cooling, stirring of food ingredients, and can allow air to be introduced into the food ingredients.

In the field of food preparation, agitation devices are chosen not only for ease of aeration and/or mixing of the food ingredients, but also for compatibility with kitchen space, temperature conditions, mixing volumes, the shape and material (e.g. Teflon®) of food mixing vessels, ease of cleaning (e.g. water-proofing or dishwasher suitability), or any combination of these requirements.

Many known agitation devices for use in food preparation, however, suffer disadvantages in that a fairly quick rotary or "beating" action must often be employed by a user in order to agitate the ingredients of a mixture to obtain a desired consistency/texture of the mixture. This action requires a vigorous rotation of the agitation device applied by way of the user flexing and rotating their wrist. In particularly thick mixtures, the force necessary to agitate the ingredients can cause a user to quickly tire due to fatigue in the wrist region and so it can be difficult for a user to maintain a constant speed of rotation of the agitation device. This issue can be a particular problem in the elderly/infirm or those with weaker wrists.

Alternative processes for mixing material(s) employ vibrating means to agitate a mixture to cause mixing of the material(s) therein. These processes can employ oscillations to act on the material(s) of the mixture to agitate the mixture. Such processes may employ vibration devices arranged to agitate vats of liquid, etc. in order to facilitate mixing of material(s). The frequency of vibration of such devices may range from infrasonic, through acoustic frequencies, to ultrasonic. These types of processes and devices are employed advantageously where it is desirable to segregate the mixing element from the substance to be mixed or where use of a mixing element may not be possible. For example, an agitation device in which mixing elements of the agitation device have to be physically inserted into a mixture may require measures (e.g. seals) to prevent contamination of the mixture and ingress of material(s) in the mixture to mechanical and/or electrical components of the agitation device and also egress of components of the device and/or lubricating fluids to the material(s) being agitated. Such measures are often expensive and difficult to implement and often are not completely effective so that they are susceptible to liquid ingress. Therefore segregating a motor and vibration technology from the actual elements to be inserted into the mixture is desirable to prevent such contamination and/or ingress/egress problems.

The present invention seeks to provide for an agitation device having advantages over known such agitation devices.

SUMMARY OF THE INVENTION

According to an aspect of the present invention, there is provided an agitation device comprising a body portion and at least one stirring element extending from said body portion and for insertion into material in a receptacle which is to be agitated, wherein the body portion comprises a housing having located therein a motion element powered by way of a power source, and arranged to impart a vibrating action to the device, and thus to the at least one stirring element, said vibrating action arranged to effect movement of the agitation device relative to the said material, and wherein said at least one stirring element extends from said body portion such that, in normal operation, the at least one stirring element extends downwardly from the body portion and serves to support the device on a surface of the said receptacle.

An advantage of the present invention is that the vibrating action of the agitation device and the function of the at least one stirring element as not only an agitating means, but also a support to maintain the agitation device substantially upright, allows the agitation device to be free-standing and, effectively, to automatically agitate or "self agitate" a material by, for example, stirring, mixing, etc. Therefore, the agitation device of the present invention can be used to agitate material(s) itself without requiring a stirring/mixing action applied by a user and without requiring a means to which the agitation device can be fixed, for example, a mixing bowl, in order to provide support for the agitation device and a static feature against which the device can act. Thus, the motion for agitating is generated between the agitation device and the mixing bowl without requiring a fixed point.

Preferably, the at least one stirring element is integral with the body portion.

An integral body portion and stirring element means provides an agitation device which comprises a single unit. An advantage of this is that the unit can be manufactured as a single article and so the problem of liquid ingress to the motion element or of the egress of motor parts and/or lubricants to the material, is avoided since there are no seals, etc. which can fail, thereby allowing such ingress/egress.

Conveniently, said motion element comprises at least one of: an off-centre motor; a piezoelectric driver; a solenoid-driven device; a rotary cam; a rotary ratchet; and a linear ratchet. The frequency of vibration of the motion element may range from infrasonic, through acoustic, to ultrasonic.

In particular, said at least one stirring element may comprise at least one prong. The at least one prong may comprise surface area enhancing features such as: holes; dimples; and ridges. Also, the at least one stirring element may be at least partly formed of a deformable material to allow the shape/configuration of the at least one stirring element to be altered dependent upon the required use of the agitation device. Additionally, or alternatively, the at least one stirring element may be at least partly formed of a resilient material. Also, the at least one stirring element may be resiliently mounted to the body portion.

Preferably, said device comprises a plurality of stirring elements which are equally spaced from one another.

Conveniently, said plurality of stirring elements are in a balloon-type whisk configuration.

Further, said power source may comprise at least one of: an electrical power source, such as a battery, which may be rechargeable; a mechanical energy source, such as a flywheel or other source of potential mechanical energy, e.g. a spiral spring; a fuel cell; or any other suitable form of storable energy.

If required, said body portion may be shaped so as to be conveniently gripped by a user. This allows the agitation device to be used as a manual agitation device should the situation require.

Preferably, said agitation device further comprises heating and/or cooling elements arranged to heat and/or cool said stirring elements.

By employing a heat source, such as a high resistance process, or by employing a cooling source, the stirring elements of said agitation device can be used to heat and/or cool ingredients that are being agitated, and/or affect adhesion of the ingredients to the stirring elements.

Preferably, the agitation device includes a user interface to enable a user to control operation of the motion element. Conveniently, said user interface comprises a switch including an on/off function. Additionally, the user interface may comprise a variable controller for allowing setting of at least one of: a frequency of vibration of said motion element; a period of operation of said motion element; intermittent operation of said motion element; a charging program for said power source; at least one heating and/or cooling operation mode and/or temperature of said agitation device.

Preferably, said user interface may be located on said housing of said body portion, but may also be located within said agitation device, or on a stirring element of said agitation device.

In particular, the agitation device may further comprise a control element, preferably programmable, to allow for setting of different operation modes.

Additionally, or alternatively, the user interface may be remotely operated. Such remote operation may be implemented by way of near field technology devices which may incorporate infra-red or Bluetooth® technologies.

Preferably, said movement of the stirring device comprises at least one of: oscillatory movement; rotational movement; and translational movement.

The present invention is described further hereinafter, by way of example only, with reference to the accompanying drawings in which:

DETAILED DESCRIPTION OF THE DRAWINGS

Figure 1:
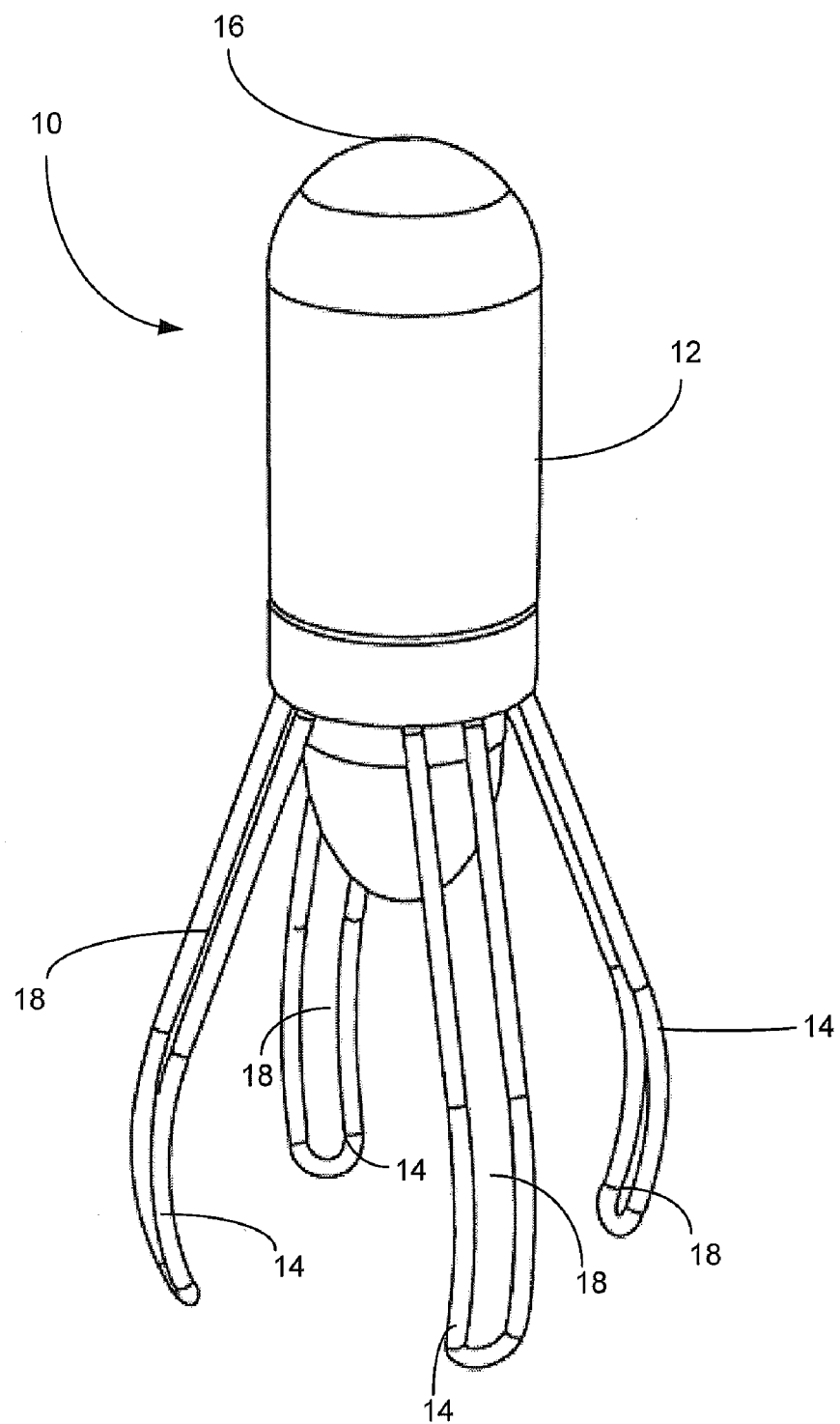
FIG. 1 illustrates a perspective view of a first embodiment of an agitation device according to the present invention.

As mentioned, FIG. 1 illustrates an agitation device 10 which comprises a body portion 12, and four equally spaced stirring elements 14 that descend downwardly from the body portion 12, and a user interface 16 to allow a user to control operation of the agitation device 10.

In the illustrated embodiment, the body portion 12 comprises a substantially cylindrical housing and the stirring elements 14 comprise elongate members, the roots of which are spaced equally about the circumference of a lower region of the body portion 12 and, in a normal orientation of the agitation device 10, extend downwardly and radially outward from the body portion 12. These stirring elements 14 may be formed from wire, tube, and may comprise prongs, fingers, or elongate "U-shaped" members. In that regard, alternate designs for stirring elements 14 are shown in U.S. Design Application No. 29304283 filed on Feb. 28, 2008, which is incorporated by reference herein. As illustrated, the stirring elements 14 also curve inwardly proximate to the ends which are remote from the body portion 12. Thus, in the illustrated arrangement, the stirring elements 14 form a shape similar to a conventional "balloon" whisk.

The user interface 16 preferably comprises a control switch arranged to allow a user to control operation of the agitation device 10. The control switch allows a user to at least switch the agitation device 10 on and off, but preferably additionally allows the user to set at least one of: a frequency of vibration of the agitation device 10 (e.g. speed settings); a period of operation of the agitation device 10 (e.g. a timer); intermittent operation of the agitation device 10; a charging program for a power source of the agitation device 10; and at least one heating and/or cooling operation mode and/or temperature of said agitation device 10.

In use, the stirring elements 14 are placed in the material(s) to be agitated and the agitation device 10 is arranged to perform an agitating action to: (i) agitate the material(s); and/or (ii) introduce air into the material(s); and/or (iii) dissipate heat. This agitating action will be described in more detail in relation to FIG. 4 but, as an initial indication, the action comprises at least one of: a rotational movement of the agitation device 10 within the said material(s); a translational movement of the agitation device 10 through the said materials(s), and an oscillatory movement of the agitation device 10 within the material(s).

The stirring elements 14 may typically be formed from at least one of: metal; wood; or polymer materials, but are not limited to these materials.

Additionally, the stirring elements 14 preferably include features to increase the surface area thereof, e.g. holes, protrusions, extensions, dimples, ridges, etc. In the illustrated arrangement, the stirring elements 14 are each formed with a hole 18 which extends substantially over the length of the stirring element.

Of course, each stirring element may be provided with a different type of surface area enhancing feature to each other stirring element, and each stirring element may comprise more than one surface area enhancing feature.

Whilst in the illustrated arrangement, the stirring elements 14 are in a "balloon whisk" configuration, other configurations could be used, e.g. a flat configuration for use in a shallow container, a small diameter for use in narrow containers, or an angled "blade" type configuration (similar to a turbine) to provide lift during rotation.

Figure 2:
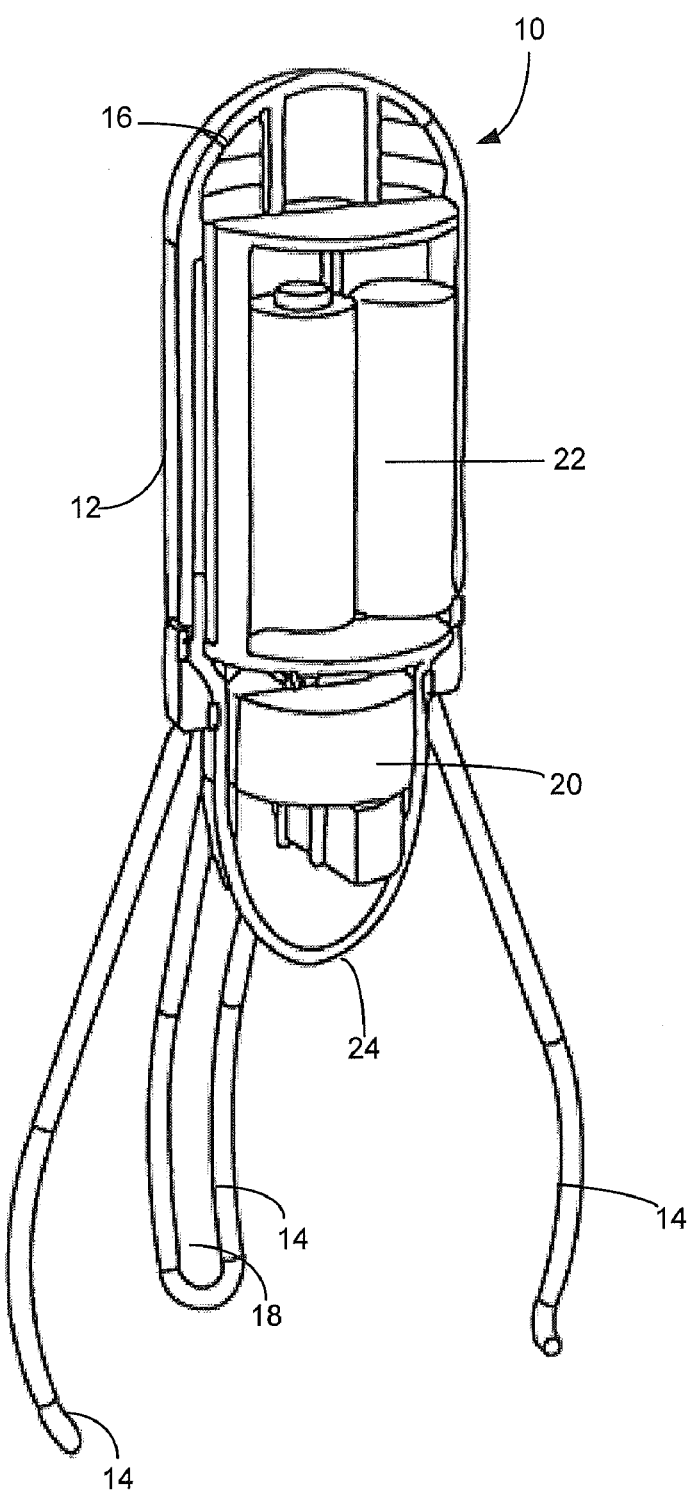
FIG. 2 illustrates a perspective cut-away view of the agitation device of FIG. 1.

FIG. 2 illustrates the agitation device 10 of FIG. 1, but with a portion cut-away to illustrate the internal features of the body portion 12. Features common with FIG. 1 are denoted by like reference numerals and will not be described further.

A motion element 20 and power source 22 comprise internal components located within said body portion 12, and the agitation device 10 further comprises a removable cover 24 forming part of the body portion 12, and arranged for removal to allow access to the motion element 20 and power source 22. The removable cover 24 may comprise a screw cap, push cap or clip.

The motion element 20 in this arrangement comprises an off-centred motor which serves to produce vibrations of the agitation device 10 by causing the agitation device to be constantly off-balance.

In an alternative arrangement, the motion element 20 and power source 22 may be permanently embedded in the body portion 12.

Figure 3:
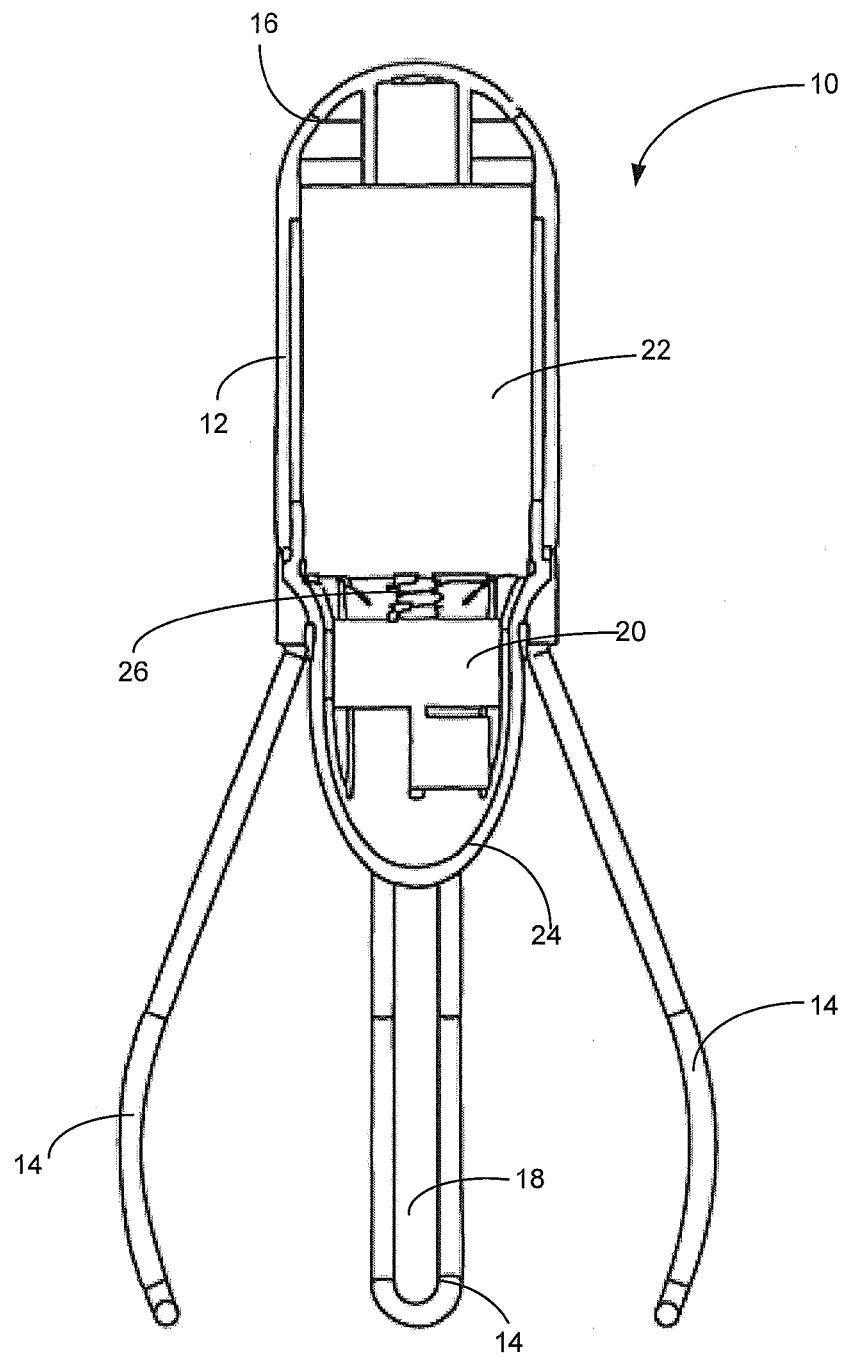
FIG. 3 illustrates a cross-sectional side view of the agitation device of FIG. 1.

FIG. 3 illustrates a cut-away view of the agitation device 10. Again, features common with those already described in relation to FIGS. 1 and 2 are denoted by like reference numerals and will not be described further.

A coupling element 26 is provided between power source 22 and motion element 20 and serves to transfer power between said power source 22 and motion element 20.

The power source 22 comprises an energy storage device and may comprise at least one of: a battery (rechargeable or otherwise); a mechanical energy storage device (such as a flywheel); or a fuel cell. The power source 22 is not limited to the above devices and any other form of storable energy would be suitable.

In the case of the power source 22 being of an electrical nature, the coupling element 26 comprises an electrical contact between power source 22 and motion element 24. Where the power source 22 is of a mechanical nature, the coupling element 26 comprises a suitable drive mechanism for transferring energy from the power source 22 to the motion element 24.

Figure 4:
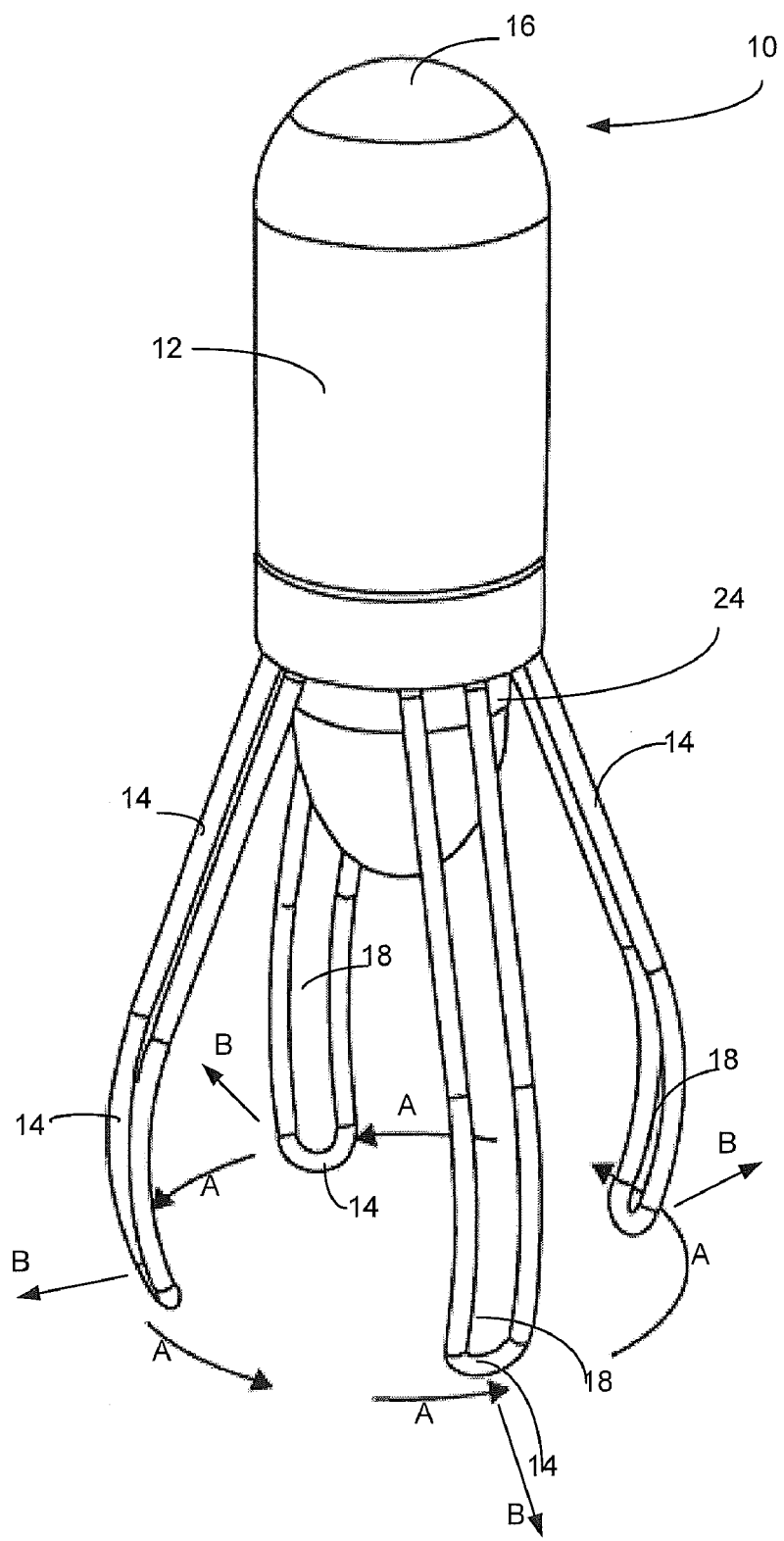
FIG. 4 illustrates a perspective view of the agitation device when in operation.

FIG. 4 illustrates the present invention agitation device 10 when in operation. Features common with those already described in relation to FIGS. 1 to 3 are denoted by like reference numerals and will not be described further.

Upon operation of the user interface 16 by a user to activate the agitation device 10, the motion element (not shown in FIG. 4) is activated to produce vibrations which serve to cause movement of the entire agitation device 10, not merely the stirring elements. Such movement can be one, or a combination of, a rotational movement (as indicated by arrows A) and a translational movement (as indicated by arrows B).

As will be appreciated, when the agitation device 10 is located in a receptacle, for example, a saucepan, with the stirring elements 14 thereof extending into material(s) to be agitated, such movement serves to agitate the material(s) and cause stirring and/or mixing thereof.

The stirring elements 14 may be at least partly formed from resilient and/or deformable material(s) which serve to transfer vibrations from the body portion 12 (caused by the motion element 20) to the tips of the stirring elements 14. These vibrations of the tips of the stirring elements 14 cause them to move relative to the surface of the container in which the stirring device 10 is located.

The vibrations produced by the motion element may vary in frequency and the frequency is, preferably, selectable by a user via the user interface 16.

In the present embodiment, the frequency of vibrations ranges from infrasonic, through acoustic, to ultrasonic.

The motion element can comprise a single element, but could also comprise a number of elements.

Whilst the agitation device has been described above as a single-piece device, in an alternative arrangement, it may comprise a separate body portion and stirring elements such that the two items can be detached from one another. In such an alternative arrangement, the stirring elements may move as one with the body portion, or may also move relative to the body portion.

The single piece device is advantageous in that it allows the device to be stood or inserted entirely into material(s) to be agitated without the risk of liquid ingress.

Further, and as described above, the body portion of the agitation device houses the motion element. However, in an alternative arrangement, the motion element may be located in the stirring elements or in a detachable separate unit.

Also, the power source and user interface may be located in the stirring elements or in a detachable separate unit. Further, the user interface may be remotely activated. In any case, the user interface is preferably waterproof, either by including a seal around the user interface, or by embedding the user interface under a sealed surface (preferably flexible).

Preferably, the body portion and/or stirring elements are formed from shock absorbing material(s). Alternatively, these features may be formed from shock neutral or shock enhancing material(s).

In a convenient arrangement, the body portion is designed to fit into the hand of a user to allow manual control of the stirrer. However, the body portion could also be shaped to allow attachment to a further device including, but not limited to, a mechanical mixer.

The above described arrangements include an off-centred motor to create vibrations of the agitation device. Other arrangements for creating such vibrations may include, but are not limited to: piezoelectric devices; solenoid driven devices; rotary cams; rotary ratchets; and linear ratchets.

It should be understood that the motion element is not limited to an electric type, but may include any suitable motion device, e.g. manually driven devices.

An agitating action of the agitation device of the present invention can include mixing and/or stirring actions.

FIGS. 5-8 illustrate an agitation device 110 according to another aspect of the present invention. Agitation device 110 comprises a main body portion 112 and a motion element, power source, coupling element and user interface similar to those described above for agitation device 10 above. Agitation device 110 has stirring elements 114 that depend downwardly from the body portion 112. The stirring elements 114 are spaced about the lower circumference of a lower region of the body portion 112 to support and maintain agitation device 110 in a free-standing condition. As shown in FIGS. 5-8, stirring elements 114 are spaced substantially equally about the circumference of the lower region of body portion 112 in a tripod arrangement. It will be appreciated that stirring elements 114 can also be spaced in other spatial arrangements. For example, instead of three stirring elements 114 spaced approximately 120° from each other, they could be arranged so that one element is spaced approximately 135° from the other two stirring elements with the other two stirring elements spaced 90° from each other. It will also be appreciated that any number of stirring elements can be utilized.

Figure 5:
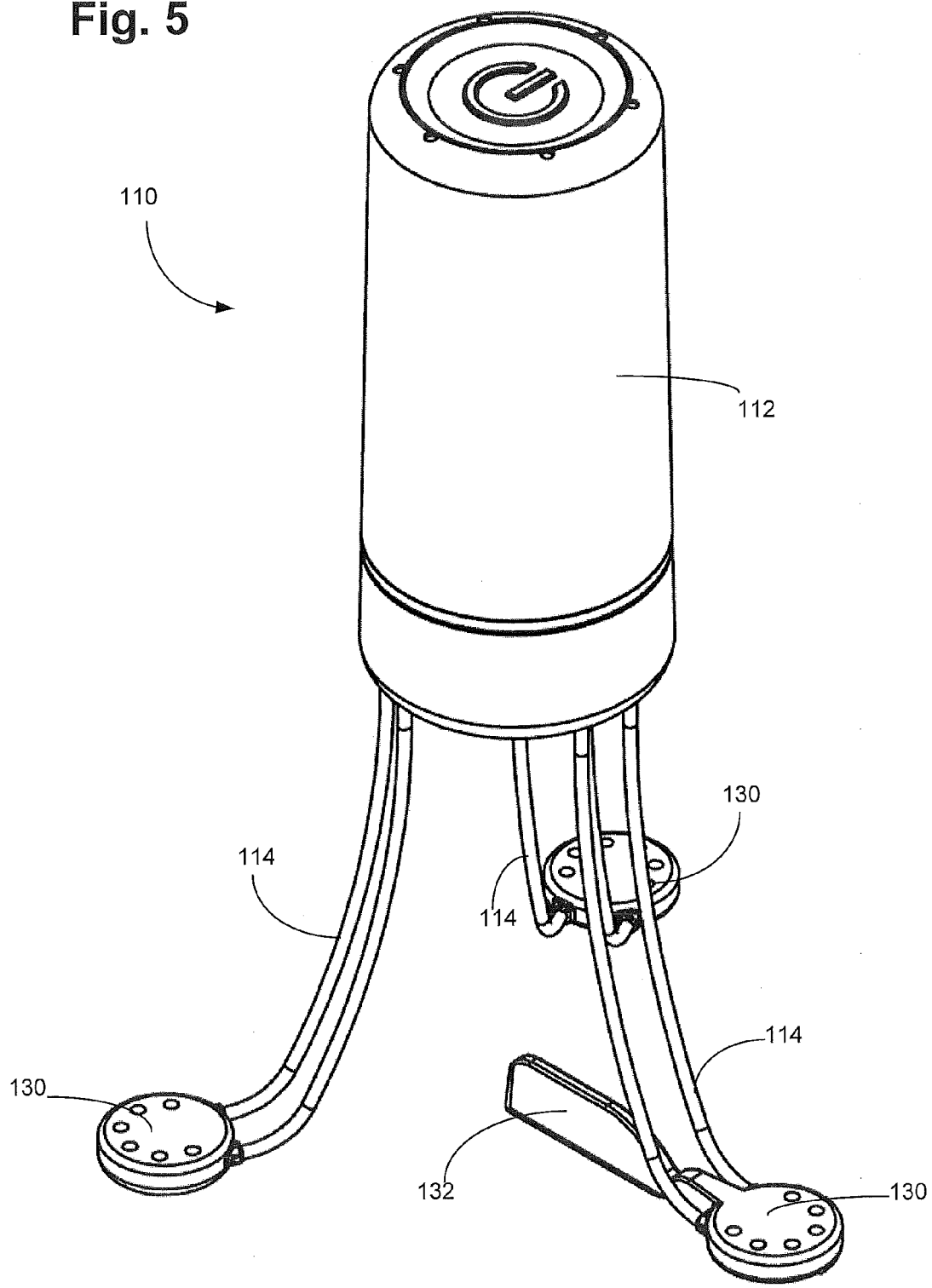
FIG. 5 illustrates a perspective view of a second embodiment of an agitation device according to the present invention.
Figure 6:
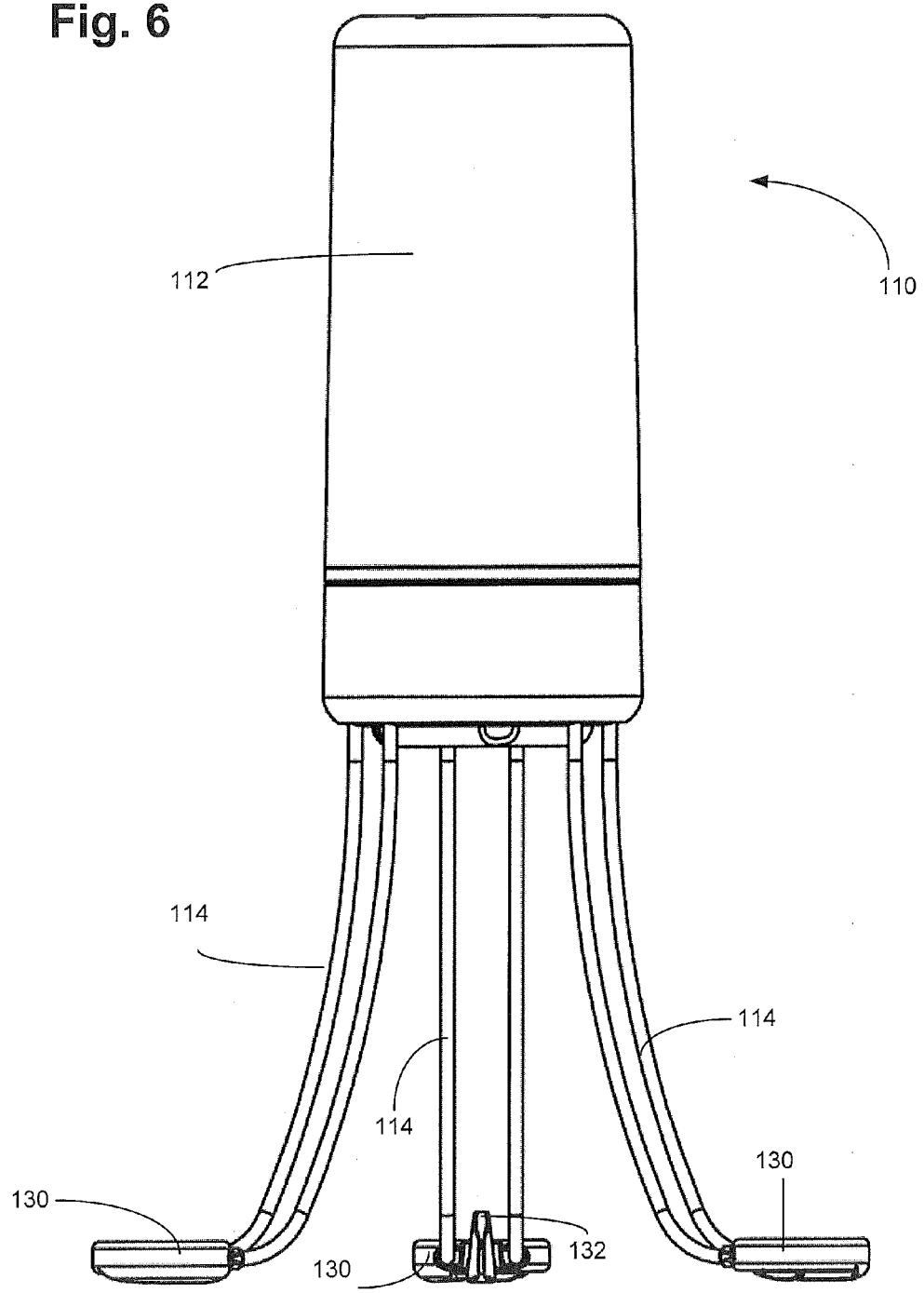
FIG. 6 illustrates a side view of the agitation device of FIG. 5.
Figure 7:
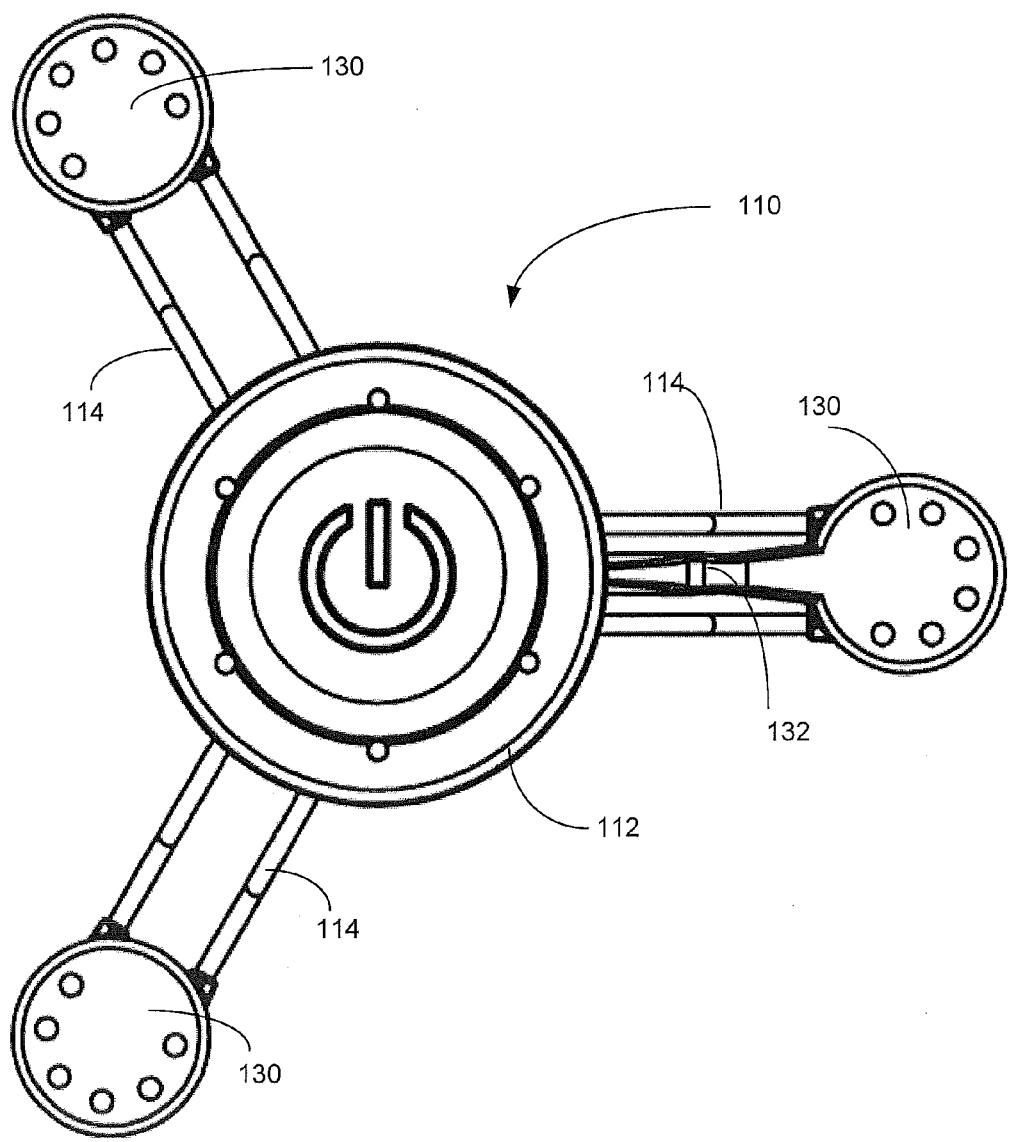
FIG. 7 illustrates a top view of the agitation device of FIG. 5.
Figure 8:
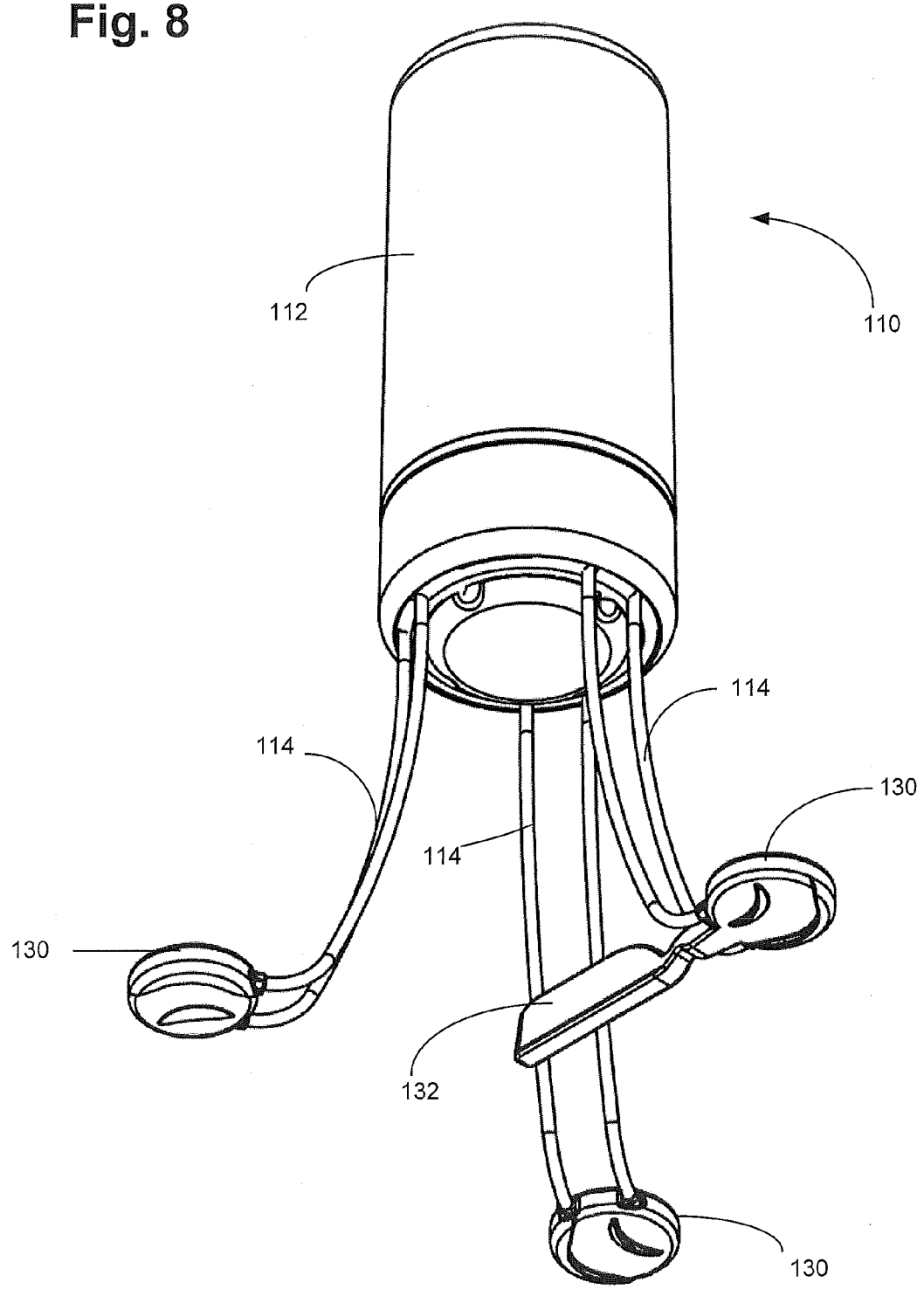
FIG. 8 illustrates another perspective view of the agitation device of FIG. 5.

Additionally, in this embodiment of the present invention, stirring elements 114 extend radially outward, relative to and distally from body 112 and agitation device 110 may further includes feet 130 (as shown in FIG. 5). The feet 130 may be used to create a more stable platform for self agitation. Also, the feet 130 may be constructed of a heat resistant material and/or nonabrasive material, such as silicone, which would prevent potential scratching of the resting surface.

Moreover, the agitation device 110 in this embodiment may include one or more fins 132. The fin 132 may be used for stabilization and to assist in scraping of materials. Additionally, to limit unwanted deflecting surfaces and splashing, the present invention includes a fin 132 with a low profile. Moreover, the fin 132 may be shaped in form of "teeth" which results in a one-way ratchet system, smooth flowing in the direction of travel and resistant and square shaped in the opposite direction. These teeth would enhance grip of materials.

The above description is presented to enable one of ordinary skill in the art to make and use the invention and is provided in the context of a patent application and its requirements. Modifications to the various embodiments and the generic principles and features described herein will be readily apparent to those skilled in the art. The present invention is not intended to be limited to the embodiments shown, but is to be accorded the widest scope consistent with the principles and features described herein.

The invention claimed is:

1. An agitation device, comprising
a body portion,
at least one stirring element, each stirring element extending downwardly from said body portion and terminating at a foot such that the agitation device includes at least one foot, wherein each stirring element and foot is adapted for insertion into material in a receptacle which is to be agitated, and wherein in normal operation, the at least one stirring element and foot serves to support the device on a surface of the said receptacle and maintain the agitation device in an upright, free-standing position relative to the surface of said receptacle, such that the agitation device is self-supporting during operation thereof, and
a housing within said body portion having located therein a motion element powered by way of a power source, and arranged to impart a vibrating action to the agitation device and thus to each stirring element, such that said vibrating action is arranged to agitate said material and effect movement of the agitation device relative to the said material.

2. The agitation device of claim 1, wherein the at least one stirring element is integral with the body portion.

3. The agitation device of claim 2, wherein said motion element comprises at least one of: an off-centered motor; a piezoelectric driver; a solenoid-driven device; a rotary cam; a rotary ratchet; and a linear ratchet.

4. The agitation device of claim 1, wherein a frequency of vibration of said motion element may range from infrasonic, through acoustic, to ultrasonic.

5. The agitation device claim 1, wherein said at least one stirring element may comprise at least one prong.

6. The agitation device of claim 5, wherein the at least one prong may comprise surface area enhancing features.

7. The agitation device of claim 6, wherein said surface area enhancing features comprise at least one of: holes; protrusions; extensions; dimples; ridges.

8. The agitation device of claim 1, wherein said at least one stirring element is at least partly formed of a deformable material.

9. The agitation device of claim 1, wherein said at least one stirring element is at least partly formed of a resilient material.

10. The agitation device of claim 1, wherein said at least one stirring element may be resiliently mounted to the body portion.

11. The agitation device of claim 1, wherein said device comprises a plurality of stirring elements which are equally spaced from one another.

12. The agitation device of claim 11, wherein said plurality of stirring elements are in a balloon-type whisk configuration.

13. The agitation device of claim 1, wherein said power source comprises at least one of: an electrical power source; a mechanical energy source; and a fuel cell.

14. The agitation device of claim 13, wherein said electrical power source comprises a rechargeable battery.

15. The agitation device of claim 1, wherein said body portion is shaped so as to be conveniently gripped by a user.

16. The agitation device of claim 1, further comprising a user interface to enable a user to control operation of the motion element.

17. The agitation device of claim 16, wherein said user interface comprises a switch including an on/off function.

18. The agitation device of claim 16, wherein the user interface comprises a variable controller for allowing setting of at least one of: a frequency of vibration of said motion element; a period of operation of said motion element; intermittent operation of said motion element; a charging program for said power source; at least one heating and/or cooling operation mode and/or temperature of said agitation device.

19. The agitation device of claim 16, wherein said user interface is located on said housing of said body portion.

20. The agitation device of claim 16, wherein said user interface is located within said agitation device.

21. The agitation device of claim 16, wherein said user interface is located on said at least one stirring element.

22. The agitation device of claim 16, wherein said user interface is arranged for remote operation.

23. The agitation device of claim 1, further comprising a programmable control element to allow for setting of different operation modes.

24. The agitation device of claim 1, wherein said movement of the stirring device comprises at least one of: oscillatory movement; rotational movement; and
translational movement.

25. The agitation device of claim 1, further comprising heating and/or cooling elements arranged to heat and/or cool said stirring elements.

26. The agitation device of claim 1, wherein said stirring element further includes a foot to further increase stabilization of said agitation device.

27. The agitation device of claim 26, wherein said foot of said at least one stirring element is covered with a heat resistant material to prevent scratching of the resting surface.

28. The agitation device of claim 26, wherein said foot of said at least one stirring element is covered with a nonabrasive material to prevent scratching of the resting surface.

29. The agitation device of claim 1 further including a fin positioned on said at least one stirring element to allow for scraping of materials.

30. The agitation device of claim 29, wherein the fin is adapted to provide stabilization for said agitation device during operation.

31. The agitation device of claim 29, wherein the fin may be adapted to form a one-way ratchet system, smooth flowing in the direction of travel and resistant and square shaped in the opposite direction.

32. The agitation device of claim 1, wherein said at least one stirring element is comprised of an elongate member extending radially outward from said body portion to provide stability to said agitation device during operation.

33. The agitation device of claim 1, wherein said motion element is comprised of an off-centered motor arranged to cause the agitation device to be constantly off-balance and thereby produce a vibrating action, such that said vibrating action is imparted to the agitation device and to each stirring element, such that each stirring element transfers said vibrating action to said material for agitation thereof.

34. The agitation device of claim 1, wherein said motion element is comprised of an off-centered motor arranged to cause the agitation device to be constantly off-balance and thereby produce a vibrating action, said off-centered motor being further arranged to impart said vibrating action to the entire agitation device and thus to each stirring element such that said vibrating action effects movement of the entire agitation device relative to said material, and further transfers said vibrating action to said material for agitation thereof.

35. The agitation device of claim 1, wherein said motion element is comprised of an off-centered motor arranged to cause the agitation device to be constantly off-balance and thereby produce a vibrating action, said off-centered motor being further arranged to impart said vibrating action to the entire agitation device and thus to each stirring element such that said vibrating action effects rotation of the entire agitation device relative to said material, and further transfers said vibrating action to said material for agitation thereof.

* * * * *